3,455,822
COMBINATION BACTERICIDE AND
CORROSION INHIBITOR
David Albert Kuhn and Olen Lonnie Riggs, Jr., Ponca City, Okla., assignors to Continental Oil Company, Ponca City, Okla., a corporation of Delaware
Filed Sept. 1, 1965, Ser. No. 484,394
Int. Cl. C23f *11/14;* E21b *43/20*
U.S. Cl. 252—8.55     9 Claims

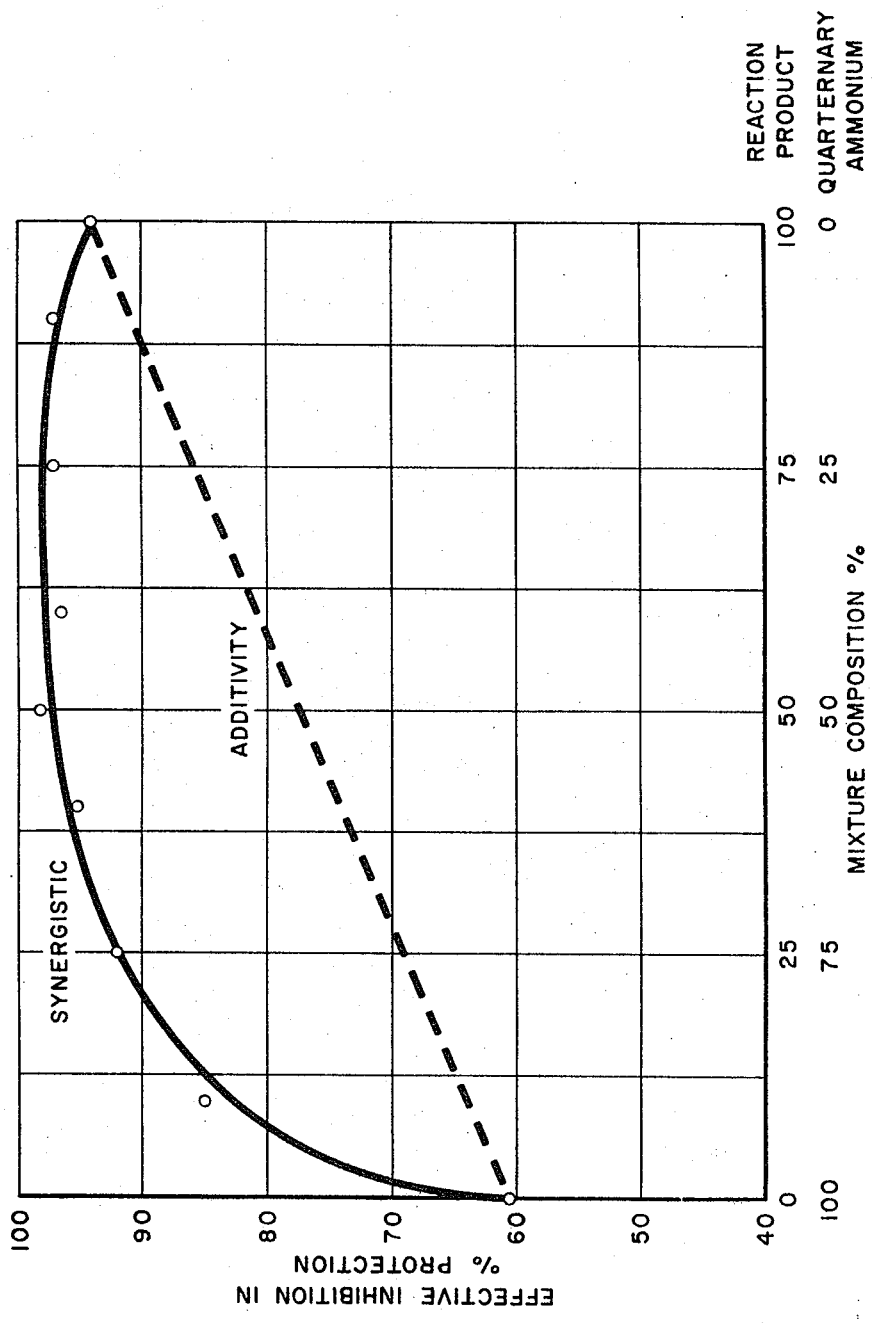

ABSTRACT OF THE DISCLOSURE

A combination bactericide-corrosion inhibitor having synergistic effects and particularly useful in subterranean formations is disclosed. The combination inhibitor-bactericide consists of a quaternary ammonium compound and an aminehydroxy organic acid condensation product. The quaternary ammonium compound may be for example an alkyl benzene substituted tri-methyl ammonium chloride and the condensation product may be the reaction product of salicylic acid and an N-alkyl polyalkylene polyamine.

---

This invention relates to petroleum production. In another aspect, this invention relates to an improved corrosion inhibitor-bactericide useful in retarding or the preventing of corrosion of metallic equipment in oil wells and connecting pipelines in intermediate storage to the refinery for crude oil.

In U.S. Patent 3,061,553 by Olen L. Riggs, Jr., it is disclosed that the reaction product formed by reacting an amine and a critical amount of an organic hydroxy acid when added to well fluids in minor proportions, acts to inhibit the rusting or corrosion of the metallic equipment in wells due to hydrogen sulfide and carbon dioxide environments.

It is also known that certain quaternary ammonium compounds are useful bactericides in oil wells especially for control of sulfate-reducing bacteria in waterflooding operations or where natural water or brine is present in the well.

While each of the above type compounds has proven of value when used in sufficient quantity for the purposes set forth and each also has limited effect for the other purpose, e.g., quaternary ammonium compounds have some corrosion inhibiting effect and the Riggs product has some bactericidal effect; on the other hand, neither compound alone is completely effective unless used in large dosages even for its primary purpose.

We have now found that when these two compounds are used together, they have a pronounced synergistic effect, each on the other.

It is an object of this invention to provide an improved corrosion inhibitor-bactericidal compound. It is another object of this invention to provide a method of treating petroleum formations to control sulfate-reducing bacteria and reduce corrosion to metal casing, tubes, conduits and the like in petroleum formations. Other objects, features, and advantages of this invention will be obvious to those skilled in the art, having been given this disclosure.

The above objects are broadly obtained by utilizing a mixture of the reaction product of one malor equivalent of an amine having a molecular weight within the range from about 150 to about 500 with 0.1 to about 0.6 equivalents of an organic hydroxy acid which is relatively heat stable and has an ionization constant of at least $1 \times 10^{-5}$ and a quaternary ammonium compound.

For any given concentration of total mixed inhibitor-bactericide in brine or water, the addition of a very small amount of quaternary ammonium compound to a very large amount of same to the amine-acid reaction product shows synergistic effect. For example, the mixture can contain 1 to 99 weight percent quaternary ammonium compound. However, for best corrosion inhibition and bacteria control, we prefer 10 to 50 weight percent quaternary ammonium and 90 to 50 weight percent reaction product. This is shown graphically in the figure.

The figure is a graph of a 10 p.p.m. of active ingredients comprising varying amounts of quaternary ammonium compound and reaction product plotted against percent protection of annealed carbon steel in a 5% brine 3 volumes and 1 volume kerosene with $H_2S$ bubbled through the system.

From the figure, it can be seen that with 100% quaternary ammonium compound at 10 p.p.m., 61% protection is obtained. With 100% reaction product at the same concentration, 94% protection is obtained. From about 10 to 60% quaternary ammonium, greater protection is obtained than is obtained from the pure inhibitor. However, it is also seen that synergism is definitely present from as little as 1% inhibitor as is shown by the additive line.

The amount of the mixed inhibitor to be used can vary over a wide range say from 1 to 5000 or more parts per million parts of well fluid, namely crude oil in brine, and preferably 5 to 500 parts per million since this latter range generally is sufficient for the purpose.

The combined inhibitor-bactericide of this invention can be introduced into the system as such, or they can be first dissolved in a suitable solvent such as mineral oil, crude oil, kerosene, gasoline, organic esters, alcohols, ketones and the like or even water. Although any solvent which is nonreactive with the mixed products can be employed, kerosene, a light hydrocarbon fraction or isopropyl alcohol are preferred since they are readily available and are miscible with the crude oil. When a solvent is used, it is generally preferred to use a concentration of mixed product in the range of about 20 to 50 weight percent.

As has been mentioned, the inhibitor of this invention is the reaction product of an amine and an organic hydroxy acid as is fully disclosed in the Riggs U.S. Patent 3,061,553.

According to that patent, "suitable amines include secondary aliphatic and heterocyclic amines. Amines having two to about five amino groups per molecule are useful. Examples of useful heterocyclic amines include: 1-aminoalkyl-2-alkylimidazolines such as 1,2-aminoethyl-2-heptadecyl imidazoline and 1-hydroxypropyl-2-pentadecylimidazoline. Very valuable reaction products may be prepared from secondary aliphatic polyamines, including the alkyl polyalkylene polyamines such as N-dodecylethylenediamine, N-octadecylethylenediamine, N-dodecyltrimethylenediamine, N-pentadecyltrimethylenediamine, N-octadecyltetramethylenediamine, N - octadecyl-1,3-butanediamine, N-dodecyldiethylenetriamine, and N-octadecyltetraethylenepentamine. Especially valuable reaction products may be prepared from the polyamine derivatives of natural oils and fats. Such a derivative is the N-alkyltrimethylenediamine material obtained by reacting tallow or tallow acids with trimethylenediamine and hydrogenating the resulting material. This derivative is commercially available from Armour and Company as Duomeen T. Other similar derivatives of trimethylenediamine are Duomeen S, O, and C that have been prepared in a similar manner from oleic acid, cocoanut, and soybean oil.

"About the only requirement is that the organic hydroxy acid be reasonably stable to heat and have an ionization constant of at least $1 \times 10^{-5}$. Examples of suitable organic hydroxy acids include: hydroxy benzoic, hydroxy butyric, hydroxy caproic, leucic acid, hydroxy caprylic, hydroxy glutamic, hydroxy glutaric, hydroxy methyl benzoic, hydroxy naphthoic, hydroxy nicotinic, hydroxy phenyl acetic, hydroxy stearic, hydroxy toluic, and hydroxy valeric.

"The reaction product of the amine and the critical amount of acid can be prepared by simply mixing the amine and the acid. The reaction product, however, can also be the dehydration product that is obtained by heating the mixture of amine and acid to temperatures at which water is eliminated. This latter type of reaction product is formed only in those instances in which the amine has a reactive hydrogen, i.e., a primary or secondary amine. Since the critical amount of acid used in preparing the reaction product is considerably less than the equivalent weight, the reaction product most probably consists of amine plus a critical amount of salt for those products prepared without elimination of water, amine plus a critical amount of amide where the amine is primary or secondary and water is eliminated, or amine plus a critical amount of imidazoline or where the amine is a polyamine having nitrogens with reactive hydrogens separated by alkylene groups of two or three carbon atoms respectively.

"Since the reaction product of this invention may be obtained by the reaction of one molecular weight equivalent of amine and from 0.1 to 0.6 molecular weight equivalent of acid, it should be obvious that the reaction products might be prepared by mixing one molecular weight of the amine with 0.25 to 1.5 molecular weight equivalents of a salt, amide, or two nitrogen heterocyclic compound that may be prepared from the amine and the acid."

The preferred reaction product then is formed by reacting 1 mol of an N-alkylpolyalkylenepolyamine having a molecular weight in the range of 150 to 500 and from two to about five amino groups per molecule with 0.1 to 0.6 equivalents of a hydroxy benzoic acid. In particular, we prefer the reaction product of 0.1 to 0.6 equivalents of salicyclic acid with an N-alkyltrimethylenediamine wherein the alkyl group contains 8 to 18 carbon atoms.

The quarternary ammonium compounds useful in this invention are of the type repreented by the formula:

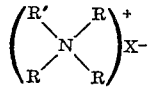

wherein:

X is a negative ion preferably chosen from the group consisting of halogens, sulfate, nitrate, citrate, acetate, hydroxide and adipate; of these, the halogen ions are preferred and of the halogen ions, chloride is most often chosen;

R is an alkyl having from 1 to about 20 carbon atoms;
R' is chosen from the group consisting of:
 (a) single ring aromatic radicals;
 (b) alkyls having from 1 to about 20 carbon atoms, and preferably from about 6 to about 18 carbon atoms; and
 (c) alkyl substituted single ring aromatic radicals, wherein the alkyl has from 1 to about 20 carbon atoms, and preferably alkyl substituted benzyl radicals wherein the alkyl has from about 6 to 18 carbon atoms.

As a group, the $C_6$ to $C_{18}$ alkylbenzene substituted trimethylammonium halides are preferred, and dodecylbenzyltrimethylammonium chloride is particularly useful.

Examples of suitable quaternary ammonium salts would include dodecylbenzyltrimethylammonium chloride, soyatrimethylammonium chloride, tallowtrimethylammonium chloride, octadecyltrimethylammonium bromide, hexadecyltrimethylammonium hydroxide, methyldodecylbenzyltrimethyl ammonium chloride, tridecylbenzylhydroxyethylimidazolinium chloride, trimethyloctadecenylammonium chloride, dibenzyloctadecylhexylammonium chloride, kerylphenyltrimethylammonium chloride, hexachlorophenylphenoxymethyl trimethylammonium chloride, lauryltrimethylammonium chloride, palmityltrimethylammonium chloride, stearyltrimethylammonium chloride, cocotrimethylammonium chloride, di(hydrogenated tallow)dimethylammonium chloride and tricaprylylmethyl ammonium chloride. Now, one or more of these quarternary ammonium salts can be used with one or more of the amine-organic hydroxy acid products in an infinite weight ratio so that it becomes apparent that any more than just a few of the possible combinations in the preferred range (e.g., 10–50 weight percent quaternary) can be given. It should also be understood that the following representative examples include only the active ingredients and that these mixtures can be put in a solvent as previously mentioned for convenience in handling.

Representative examples of the preferred mixtures include 20% dodecylbenzyltrimethylammonium chloride and 80% of the reaction product N-dodecylethylenediamine and salicylic acid; 10% soyatrimethylammonium chloride, 15% octadecyltriethylammonium chloride, 50% reaction product 1,2 aminoethyl-2-heptadecylimidazoline and 25% 1-hydroxypropyl-2-pentadecylimidazoline with hydroxybenzoic acid; 30% hexadecyltrimethylammonium hydroxide and 70% reaction product N-octylmethylenediamine with leucic acid; 50% octadecyltrimethylammonium bromide and 50% reaction product N-octadecyl-1,3-diethylenetriamine with hydroxyvaleric acid and the like. Since a great many suitable quaternary ammonium salts have been set forth as well as typical reaction products, it is believed these few mixed component systems will suffice to illustrate to those skilled in the art the nature of our preferred synergistic mixtures.

Once the mixture has been prepared, either alone or in solution, then sufficient amount of the resulting mixture will be used to give the desired concentration of synergistic mixture in the well fluid. For example, a 10% mixture of dodecylbenzyltrimethylammonium chloride and 90% Duomeensalicylamide in a 40% solution in kerosene is used to supply 25 p.p.m. of the two active ingredients (in combination) to the petroleum well fluid, said well fluid composing 5% brine and crude oil.

To further illustrate the invention, several runs were made to show the synergistic effect of the combination in corrosion inhibition over the use of the inhibitor alone. The tests were made using 1020 carbon steel coupons which had been cleaned by sandblasting. The coupons were placed in containers which contained water or brine and the desired concentration of inhibitor.

Example I

In this series of runs, 1" x 3" annealed carbon steel coupons were placed in a bubble apparatus containing 3 to 1 volume ratio of 5% NaCl brine to kerosene and the desired combination of inhibitor and bactericide at 10 p.p.m. concentration. $H_2S$ was bubbled through the mixture for 42 hours. Duplicate tests were made wherein no inhibitor was employed and the percent protection calculated. The inhibitor was a commercially prepared Duomeensalicylamide, and the bactericide was a commerically prepared dodecylbenzyltrimethylammonium chloride.

The data are shown in the table:

| Run | Percent Inhibitor | Bactericide | Protection |
|---|---|---|---|
| 1 | 100 | 0 | 94.0 |
| 2 | 90 | 10 | 96.3 |
| 3 | 75 | 25 | 96.1 |
| 4 | 60 | 40 | 96.6 |
| 5 | 50 | 50 | 98.4 |
| 6 | 40 | 60 | 95.2 |
| 7 | 25 | 75 | 92.4 |
| 8 | 10 | 90 | 85.0 |
| 9 | 0 | 100 | 61.0 |

From the above table, it can readily be seen that when the inhibitor exceeds about 40% of the combination, but is less than 100%, the mixture is superior to the inhibitor alone. However, even at low percent inhibitor, the protection is superior to that which would be based on the additive effect of the two materials. These data are plotted on the FIGURE to graphically demonstrate the effect.

Example II

Runs as in Example I were made using the same type inhibitor and bactericide but from a different plant batch at different inhibitor levels. In this case, the mixed inhibitor contained 25 wt. percent bactericide, 17 weight percent inhibitor (60/40) and 58 weight percent isopropyl alcohol. The data are given below:

1. $H_2S$ Bubble Test
   150 ml. 5% NaCl brine
   50 ml. kerosene
   $H_2$ 0.5 ml./min. flowrate
   1,020 annealed carbon steel coupon
   25° C.

| Run | Concentration, p.p.m. | Percent Protection Inhibitor alone | Inhibitor plus Bactericide |
|---|---|---|---|
| 10 | 100 | 98.1 | 99.9 |
| 11 | 50 | 97.5 | 99.7 |
| 12 | 25 | 6.8 | 99.4 |
| 13 | 10 | 95.3 | 99.5 |
| 14 | 5 | 94.4 | 99.2 |

2. $CO_2$ Bubble Test
   Brine, kerosene, temperature and steel as above
   $CO_2$ 1.0 ml./min. flowrate

| Run | Concentration, p.p.m. | Percent Protection Inhibitor alone | Combination |
|---|---|---|---|
| 15 | 100 | 86.9 | 94.8 |
| 16 | 50 | 86.2 | 94.1 |
| 17 | 25 | 91.1 | 95.4 |
| 18 | 10 | 87.0 | 94.9 |
| 19 | 5 | 69.7 | 94.0 |

From the above data, it is readily seen that the bactericide provides synergism for the corrosion inhibitor in both $H_2S$ and $CO_2$ environments.

Example III

Runs were made to show the synergistic effect of the inhibitor on the bactericide using the isopropyl alcohol blend of Example I; however, the specific inhibitor and bactericide were not of the same plant run. The runs were made to determine time-kill against sulfate-reducing bacteria (Desulfavibrio).

| | | Percent kill after contact of— | | | |
|---|---|---|---|---|---|
| | | 30 min. | | 60 min. | |
| | | 100% active chemical at— | | | |
| Run | | 10 p.p.m. | 25 p.p.m. | 10 p.p.m. | 25 p.p.m. |
| | | Fresh water test [a] | | | |
| 20 | Bactericide alone | 99.0 | 99.5 | 98.2 | 97.7 |
| 21 | Combination | 99.8 | 100.0 | 98.2 | 100.0 |
| | | Brine test [b] | | | |
| 22 | Bactericide alone | 98.3 | 98.3 | 98.1 | 100.0 |
| 23 | Combination | 99.6 | 99.9+ | 100.0 | 100.2 |

[a] Supply well water from White Mesa, Utah (San Juan River).
[b] Produced water from NW. Camp Lease Waterflood, Loco, Oklahoma.

Example IV

While the quaternary ammonium salts are relatively effective in small quantities against sulfate-reducing bacteria (Desulfavibrio) as is shown above, it is generally recommended that such compounds be utilized in an amount to supply 1,000 to 5,000 p.p.m. based on the well fluid for complete bacteria control. For example, the *Pseudomonas fluorescens* are extremely resistant to bactericides and trouble is frequently encountered in the field by excessive growth of such bacteria resulting in well plugging.

Several runs were made using the bactericide of the previous runs and the inhibitor of the previous runs to more clearly show the bactericidal synergism of the mixed compounds wherein distilled water was contaminated with *Pseudomonas fluorescens* and the time kill compared. The data are shown below:

| | Bacteria Count, Colonies/ml. after— | | | | | | | | |
|---|---|---|---|---|---|---|---|---|---|
| | 15 minutes | | | 30 minutes | | | 60 minutes | | |
| Bactericide | 5 p.p.m. | 10 p.p.m. | 15 p.p.m. | 5 p.p.m. | 10 p.p.m. | 15 p.p.m. | 5 p.p.m. | 10 p.p.m. | 15 p.p.m. |
| Quaternary ammonium salt | 302,000 | 302,000 | 302,000 | 284,000 | 284,000 | 284,000 | 298,000 | 298,000 | 298,000 |
| Reaction prod | 302,000 | 15,360 | 7,600 | 284,000 | 610 | 550 | 42,840 | 80 | 45 |
| 80 quat./20 reac | 3,960 | 52 | 19 | 1,120 | 36 | 12 | 620 | 17 | 3 |
| 65 quat./35 reac | 230 | 8 | 4 | 163 | 5 | 1 | 237 | 0 | 0 |
| 50 quat./50 reac | 72 | 10 | 9 | 18 | 6 | 0 | 6 | 2 | 0 |
| 35 quat./65 reac | 90 | 4 | 0 | 8 | 0 | 0 | 5 | 0 | 0 |
| 20 quat./80 reac | 198 | 7 | 1 | 42 | 3 | 0 | 1 | 0 | 0 |
| Control | 302,000 | 302,000 | 302,000 | 284,000 | 284,000 | 284,000 | 298,000 | 298,000 | 298,000 |

From the above table, it can be seen that at the low concentrations of the quaternary ammonium salt, no improvement was obtained. It is interesting that the inhibitor was actually more effective against this particular strain of bacteria than was the well known bactericide utilized against the sulfate reducing bacteria. However, the table clearly shows the effect of synergism when the two compounds are used in admixture regardless of which is considered the bactericide.

Having thus described the invention by providing specific examples thereof, it is to be understood that no undue limitations or restrictions are to be drawn by reason thereof and that many variations and modifications are within the scope of the invention.

We claim:

1. An improved bactericide-corrosion inhibitor wherein the essential ingredients consist of an admixture of 1 to 99 parts of a $C_6$ to $C_{18}$ alkylbenzene substituted trimethyl ammonium chloride and the remainder of the essential ingredients is the reaction product formed by reacting 1 mole of an N-alkyl trimethylene diamine wherein the alkyl group contains 8–18 carbon atoms with 0.1 to 0.6 equivalent of salicylic acid at a temperature sufficiently high to effect elimination of water.

2. The composition of claim 1 wherein the N-alkyl trimethylene diamine is the reaction product of a tallow acid with trimethylenediamine and which has been hydrogenated to form the N-tallow trimethylenediamine.

3. The composition of claim 2 wherein the quaternary ammonium compound comprises 10 to 50 weight parts of the total active ingredients.

4. The composition of claim 3 wherein the ammonium compound is dodecylbenzyltrimethylammonium chloride.

5. The composition of claim 4 wherein the N-alkyl trimethylene diamine is N-pentadecyltrimethylenediamine.

6. A method of inhibiting corrosion of ferrous metals in contact with corrosive oil well fluids containing an acidic reactant selected from the group consisting of carbon dioxide and hydrogen sulfide and controlling Desulfavibrio bacteria in said fluid which comprises the addition of at least 1 part per million of said fluids a mixture consisting as the active ingredients 1 to 99 weight parts per 100 parts of said active ingredients of a $C_6$ to $C_{18}$ alkylbenzene substituted trimethylammonium chloride and the remainder of the essential ingredients is the reaction product formed by reacting 1 mole of an N-alkyl trimethylene diamine wherein the alkyl group contains 8 to 18 carbon atoms with 0.1 to 0.6 equivalent of salicylic acid at temperature sufficiently high to effect elimination of water.

7. The method of claim 6 wherein said mixture is added in an amount from 5 to 500 parts per million based on the corrosive containing fluids.

8. The method of claim 7 wherein the quaternary ammonium compound comprises 10 to 50 weight percent of the added mixture.

9. The method of claim 8 wherein the quaternary ammonium compound is dodecylbenzyltrimethylammonium chloride and the N-alkyl trimethylene diamine is prepared from tallow acid and trimethylenediamine which subsequently hydrogenated to the N-tallow trimethylenediamine.

References Cited
UNITED STATES PATENTS

| | | | |
|---|---|---|---|
| 2,692,231 | 10/1954 | Stayner et al. | 252—8.55 X |
| 2,867,279 | 1/1959 | Cocks | 252—8.55 X |
| 2,917,428 | 12/1959 | Hitzman | 252—8.55 X |
| 3,061,553 | 10/1962 | Riggs | 252—392 |
| 3,164,552 | 1/1965 | Wolfson | 252—8.55 |
| 3,199,591 | 8/1965 | Kepley | 252—8.55 X |
| 3,329,610 | 7/1967 | Kreuz et al. | 252—8.55 |

HERBERT B. GUYNN, Primary Examiner

U.S. Cl. X.R.

424—269, 325, 329